United States Patent
Sahara

(10) Patent No.: US 8,411,860 B2
(45) Date of Patent: Apr. 2, 2013

(54) WIRELESS COMMUNICATION SYSTEM, BASE STATION, TERMINAL AND WIRELESS COMMUNICATION METHOD

(75) Inventor: Toru Sahara, Yokohama (JP)

(73) Assignee: Kyocera Corporation, Kyoto (JP)

(*) Notice: Subject to any disclaimer, the term of this patent is extended or adjusted under 35 U.S.C. 154(b) by 292 days.

(21) Appl. No.: 12/740,345

(22) PCT Filed: Oct. 29, 2008

(86) PCT No.: PCT/JP2008/069635
§ 371 (c)(1),
(2), (4) Date: Jul. 22, 2010

(87) PCT Pub. No.: WO2009/057631
PCT Pub. Date: May 7, 2009

(65) Prior Publication Data
US 2010/0296650 A1    Nov. 25, 2010

(30) Foreign Application Priority Data
Oct. 30, 2007  (JP) ............................ P2007-281690

(51) Int. Cl.
*H04K 1/00* (2006.01)
*H04L 9/00* (2006.01)

(52) U.S. Cl. ............ 380/268; 380/28; 380/46; 380/247; 380/270

(58) Field of Classification Search ............ 380/31, 380/28, 46, 247, 268, 270
See application file for complete search history.

(56) References Cited

U.S. PATENT DOCUMENTS 5,617,476 A * 4/1997 Ibaraki et al. ................. 380/267
7,929,549 B1 * 4/2011 Talbot ....................... 370/395.7
8,126,076 B2 * 2/2012 Sartori et al. ................. 375/267
2004/0105489 A1 * 6/2004 Kim et al. ..................... 375/140
2008/0279377 A1 * 11/2008 Ji ................................. 380/210

FOREIGN PATENT DOCUMENTS

JP   2007-028289   2/2007
JP   2007-129755   5/2007

OTHER PUBLICATIONS

3GPP R1-050789, Aug. 29, 2005, Section 3.
International Search Report for PCT/JP2008/069635, mailed on Dec. 16, 2008, 1 page.
JP Office Action and English translation, for JP Patent Application No. 2009-539084, dated May 29, 2012.

* cited by examiner

*Primary Examiner* — Mohammad W Reza
(74) *Attorney, Agent, or Firm* — Duane Morris LLP

(57) ABSTRACT

A base station of a wireless communication system includes: a base station side data generation portion generating a number of sets of scramble data which are different from each other while the number of sets of the scramble data is the same as or more than the number obtained by multiplying the number of the sub-channels used in said overall wireless communication system by the number of the subcarriers; a base station side storage portion which stores the scramble data; a base station side upper layer control portion which outputs both transmission data for a terminal at other end of a communication and information of sub-channels; a base station side lower layer control portion which, based on the information of the sub-channels, controls the base station side storage portion to output scramble data corresponding to the sub-channels; a base station side scramble portion which conducts a multiplication operation between the transmission data output from the base station side upper layer control portion and the scramble data output from the base station side storage portion based on a control by the base station side lower layer control portion.

15 Claims, 6 Drawing Sheets

WIRELESS COMMUNICATION SYSTEM, BASE STATION, TERMINAL AND WIRELESS COMMUNICATION METHOD

TECHNICAL FIELD

This is a U.S. National Phase Application of International Application No. PCT/JP2008/069635 filed Oct. 29, 2008, which claims priority to Japanese Patent Application No. 2007-281690 filed Oct. 30, 2007, the disclosures of which are incorporated herein by reference in their entirety. The present application relates to a wireless communication system, a base station, a terminal and a wireless communication method.

BACKGROUND ART

In recent years, multicarrier communication systems, for example, OFDM (Orthogonal Frequency Division Multiplexing) and OFDMA (Orthogonal Frequency Division Multiple Access) are remarkably recognized as next generation broadband mobile communication systems. For example, OFDM is a technique which realizes multi-access by sharing subcarriers mutually in orthogonal relationship between multiple terminals, assigning arbitrarily selected multiple subcarriers as sub-channels and adaptively assigning a sub-channel to each terminal at an arbitral time (in a system to which TDMA is applied, such a communication time corresponds to, for example, a slot). In Patent Document 1 shown below, a technique is suggested which lowers a ratio between a peak power and an average power of transmission signals in a multicarrier communication system as described above by applying a scrambling operation on sequences of symbols (multiple carrier signals) which are arranged according to frequencies.

[Patent Document 1] Japanese Patent Application, First Publication No. 2007-129755

In the above-described prior art, when a scrambling operation is conducted with regard to each sub-channel, the data is randomized along a frequency direction. However, the same scrambling operation is conducted on each sub-channel, and a problem is caused in which a peak factor is increased. When resolving such a problem, to randomize data between the sub-channels, how to change scramble data is an important point that is used in a multiplication operation applied to the data with regard to each sub-channel.

For example, in a regulation of ARIB which uses the TDD/TDMA method, it is regulated that an operation of randomizing the data is conducted by a multiplication operation on the data by using the scramble data which is serially output from a shift register to which a portion of an identifier of a base station is applied as an initial value. By applying such a method to a multicarrier communication system, for example, OFDM and OFDMA, and by generating the scramble data based on a different initial value with regard to each sub-channel, it is possible to conceive a randomization method with regard to data between sub-channels. However, in accordance with such a method, it is necessary to provide memory for storing the scramble data in accordance with a number of sub-channels, and a problem of increased cost is caused. On the other hand, to avoid such a problem, a method can be conceived in which the scramble data is generated every time the data is transmitted. However, in accordance with such a method, a problem of low communication speed is caused.

DISCLOSURE OF INVENTION

The present invention was conceived to solve the above-described problems and has an object of, when using the multicarrier communication, reducing the peak factor by randomizing data between the sub-channels without both increased cost and low communication speed.

In order to achieve the above-described objects, the present invention provides a first solution regarding a wireless communication system which conducts a communication between a first and second apparatuses by using sub-channels constituted from a plurality of subcarriers, wherein said base station includes: a base station side data generation portion generating a number of sets of scramble data which are different from each other while the number of sets of the scramble data is more than a number obtained by multiplying the number of the sub-channels used in said overall wireless communication system by the number of the subcarriers; a base station side storage portion which stores the scramble data generated by the base station side data generation portion; a base station side upper layer control portion which outputs both transmission data for a terminal at the other end of a communication and information of sub-channels that are assigned to the terminal at the other end of the communication; a base station side lower layer control portion which, based on the information of the sub-channels, controls the base station side storage portion to output scramble data corresponding to the sub-channels that are assigned to the terminal at the other end of the communication; and a base station side scramble portion which conducts a multiplication operation between the transmission data output from the base station side upper layer control portion and the scramble data output from the base station side storage portion based on a control by the base station side lower layer control portion, said terminal apparatus comprises: a terminal side data generation portion which, when establishing a communication connection with the base station, based on base station information received from the base station at the other end of the communication, generates the same scramble data as the base station at the other end of the communication; a terminal side memory which stores the scramble data generated by the terminal side data generation portion; a terminal side upper layer control portion which outputs both transmission data which is transmitted to the base station at the other end of the communication and information of the sub-channels assigned by the base station at the other end of the communication; a terminal side lower layer control portion which controls the terminal side storage portion to output the scramble data corresponding to the sub-channels that are assigned by the base station at the other end of the communication based on the information of the sub-channels; and a terminal side scramble portion which conducts a multiplication operation between the transmission data output from the terminal side upper layer control portion and the scramble data output from the terminal side storage portion based on a control by the terminal side lower layer control portion.

Further, the present invention provides a second solution regarding a wireless communication system which is the above-described wireless communication system, wherein said base station further comprises a base station side descramble portion which conducts a multiplication operation between received data received from the terminal and the scramble data output from the base station side storage portion, and said terminal further comprises a terminal side descramble portion which conducts a multiplication operation between received data received from the base station and the scramble data output from the terminal side station side storage portion.

Further, the present invention provides a third solution regarding a wireless communication system which is the above-described wireless communication system, wherein each of the base station side data generation portion and the terminal side data generation portion further includes a shift register corresponding to a number of bits B which satisfies a condition formula $2^B-1 \geq Ns \times Nc$ while Ns is a number of the sub-channels, Nc is a number of the subcarriers and B is a number of bits; and an OR circuit which includes: one input terminal which is connected to an output terminal of a final step of the shift register; another input terminal which is connected to an output terminal of a predetermined step of the shift register; and an output terminal which is connected to an input terminal of the shift register.

The present invention provides a first solution regarding a base station which conducts a communication with a terminal by using sub-channels constituted from a plurality of subcarriers, including: a base station side data generation portion generating a number of sets of scramble data which are different from each other while the number of sets of the scramble data is more than a number obtained by multiplying the number of the sub-channels used in said overall wireless communication system by the number of the subcarriers; a base station side storage portion which stores the scramble data generated by the base station side data generation portion; a base station side upper layer control portion which outputs both transmission data for a terminal at other end of a communication and information of sub-channels that are assigned to the terminal at the other end of the communication; a base station side lower layer control portion which, based on the information of the sub-channels, controls the base station side storage portion to output scramble data corresponding to the sub-channels that are assigned to the terminal at the other end of the communication; and a base station side scramble portion which conducts a multiplication operation between the transmission data output from the base station side upper layer control portion and the scramble data output from the base station side storage portion based on a control by the base station side lower layer control portion.

The present invention provides a second solution regarding a base station which is the above-described base station further including a base station side descramble portion which conducts a multiplication operation between received data received from the terminal and the scramble data output from the base station side storage portion.

The present invention provides a third solution regarding a base station which is the above-described base station further including: a shift register corresponding to a number of bits B which satisfies a condition formula $2^B-1 \geq Ns \times Nc$ while Ns is a number of the sub-channels, Nc is the number of the subcarriers and B is the number of bits; and an OR circuit which comprises: one input terminal which is connected to an output terminal of a final step of the shift register; another input terminal which is connected to an output terminal of a predetermined step of the shift register; and an output terminal which is connected to an input terminal of the shift register.

The present invention provides a first solution regarding a terminal which conducts a communication with a base station by using sub-channels constituted from a plurality of subcarriers, including: a terminal side data generation portion which, when establishing a communication connection with the base station, based on base station information received from the base station at the other end of the communication, generates the same scramble data as the base station at the other end of the communication; a terminal side memory which stores the scramble data generated by the terminal side data generation portion; a terminal side upper layer control portion which outputs both transmission data which is transmitted to the base station at the other end of the communication and information of the sub-channels assigned by the base station at the other end of the communication; a terminal side lower layer control portion which controls the terminal side storage portion to output the scramble data corresponding to the sub-channels that are assigned by the base station at the other end of the communication based on the information of the sub-channels; and a terminal side scramble portion which conducts a multiplication operation between the transmission data output from the terminal side upper layer control portion and the scramble data output from the terminal side storage portion based on a control by the terminal side lower layer control portion.

Further, the present invention provides a second solution regarding a terminal which is the above-described terminal, further including a terminal side descramble portion which conducts a multiplication operation between received data received from the base station and the scramble data output from the terminal side station side storage portion.

Further, the present invention provides a third solution regarding the above-described terminal, wherein said terminal side data generation portion comprises: a shift register corresponding to the number of bits B which satisfies a condition formula $2^B-1 \geq Ns \times Nc$ while Ns is a number of the sub-channels, Nc is the number of the subcarriers and B is the number of bits; and an OR circuit which comprises: one input terminal which is connected to an output terminal of a final step of the shift register; another input terminal which is connected to an output terminal of a predetermined step of the shift register; and an output terminal which is connected to an input terminal of the shift register.

Further the present invention provides a solution regarding a wireless communication method for conducting a communication between a base station and a terminal by using sub-channels constituted from a plurality of subcarriers, including: a first step of, on the base station, generating a number of sets of scramble data which are different from each other while the number of sets of the scramble data is more than the number obtained by multiplying the number of the sub-channels used in the overall wireless communication system by a number of the subcarriers; a second step of storing the scramble data generated in the first step; a third step of, based on the information of the sub-channels, reading the scramble data corresponding to the sub-channels assigned to the terminal at the other end of the communication from the scramble data stored in the second step; a fourth step of conducting a multiplication operation between the scramble data read in the third step and transmission data which is transmitted to the terminal at the other end of the communication; a fifth step of, by the terminal, when establishing a communication connection with the base station, based on base station information received from the base station at the other end of the communication, generating the same scramble data as the base station at the other end of the communication; a sixth step of storing the scramble data generated in the fifth step; a seventh step of, based on the information of the sub-channels that are assigned by the base station at the other end of the communication, reading the scramble data corresponding to the sub-channels that are assigned by the base station at the other end of the communication from the scramble data stored in the sixth step; and an eighth step of conducting a multiplication operation between the scramble data read in the seventh step and the transmission data which is transmitted to the base station at the other end of the communication.

By using the present invention, it is not necessary to include storing portions for storing the scramble data in accordance with a number of sub-channels, and it is possible to avoid an increase in cost. In addition, regarding a base station, when the base station is started, and regarding a terminal, when the terminal establishes a communication connection with the base station which is at the other end of a communication, the scramble data is stored in the storing portion, and in a communication conducted afterward, a randomizing (scramble) operation is conducted on data between sub-channels by using the scramble data stored in the storing portion. Therefore, a problem is not caused in which the communication speed is deteriorated by using such a method of generating the scramble data every time the data is transmitted. Hence, in the present invention, when using the multicarrier communication, it is possible to reduce the peak factor by randomizing data between the sub-channels without both increased cost and low communication speed.

DESCRIPTION OF THE REFERENCE SYMBOLS

Figure 1:
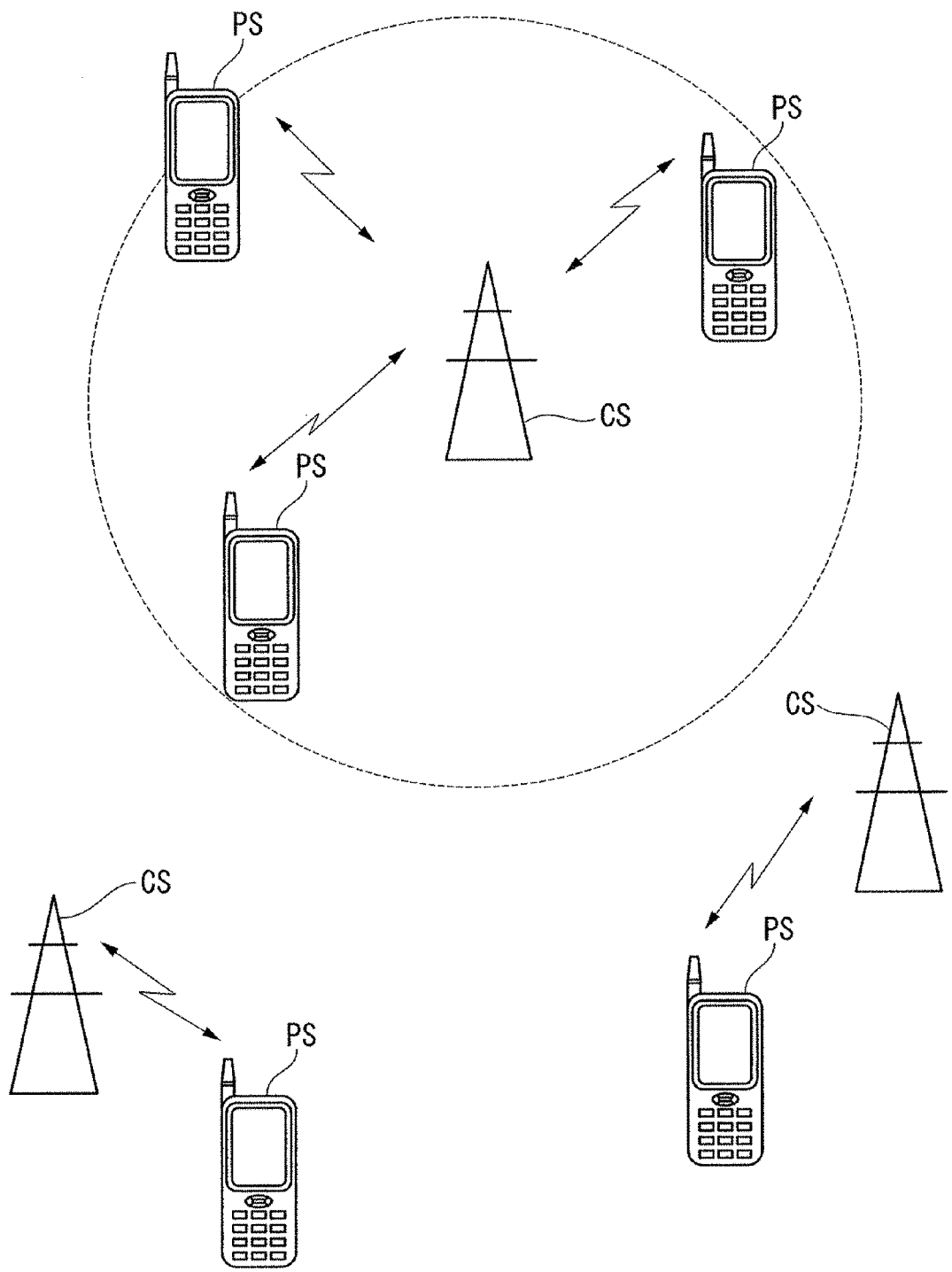
FIG. 1 is a drawing showing an outline constitution of a wireless communication system of one embodiment of the present invention.

CS . . . base station
PS . . . terminal
1, 10 . . . OFDM signal transmission portion
2, 20 . . . OFDM signal receiving portion
3, 30 . . . base station side upper layer control portion
4, 40 . . . base station side data generation portion
5, 50 . . . base station side memory
6, 60 . . . base station side memory control portion
1a, 10a . . . CRC code appending portion
1b . . . base station side scramble portion
10b . . . terminal side scramble portion
1c, 10c . . . error correction code appending portion
1d, 10d . . . serial/parallel conversion portion
1e, 10e . . . subcarrier modulation portion
1d, 10d . . . inverse Fourier transformation portion
1g, 10g . . . guard interval insertion portion
1h, 10h . . . wireless signal transmission portion
2a, 20a . . . wireless signal receiving portion
2b, 20b . . . guard interval removing portion
2c, 20c . . . . Fourier transformation portion
2d, 20d . . . subcarrier demodulation portion
2e, 20e . . . parallel/serial conversion portion
2f, 20f . . . error correction portion
2g . . . base station side descramble portion
20g . . . terminal side descramble portion
2h 20h . . . CRC calculation portion

BEST MODE FOR CARRYING OUT THE INVENTION

Hereinafter, preferable embodiments of the present invention are explained in reference to the drawings. However, the present invention is not limited by the embodiments explained below, and for example, it is possible to appropriately combine constitutional elements of the embodiments.

First, one embodiment of the present invention is explained in details in reference to an example of a wireless communication system to which OFDM method is applied for a multicarrier communication. As shown in FIG. 1, a wireless communication system of this embodiment is constituted from base stations CS, terminals PS and a network which is not shown in the drawings. The base stations CS and the terminals PS conduct a communication by using a multi-access technique which is, for example, a time division multiple access (TDMA) method, a time division duplex (TDD) method and in addition, an orthogonal frequency division multiplex access (OFDMA) method. The base stations CS are multiple, are arranged at positions that apart a certain distance each other, and conduct a wireless communication by conducting multiple access with multiple terminals PS.

Figure 2:
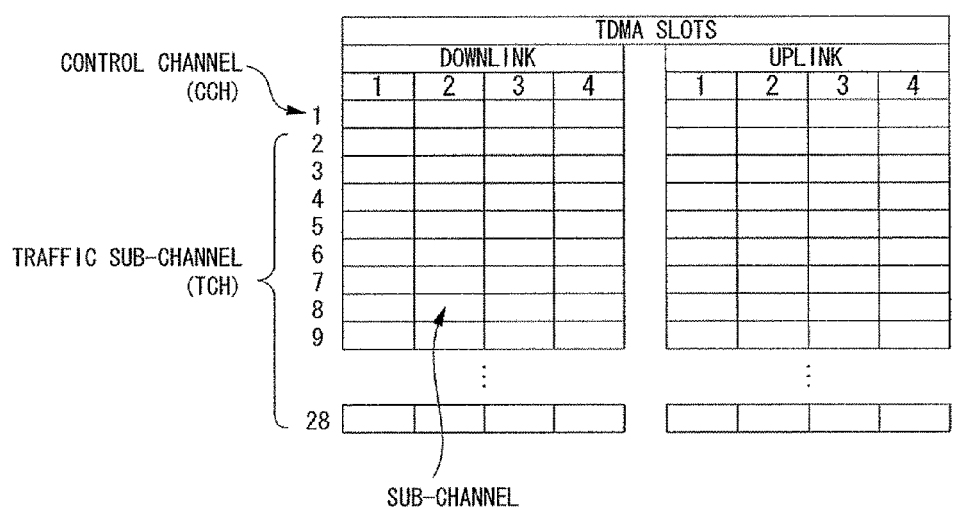
FIG. 2 is a schematic drawing showing a relationship between frequencies, slots and sub-channels of a wireless communication system of one embodiment of the present invention.

As is generally understood, in the OFDMA method, all subcarriers which are orthogonal to each other are shared by all terminals PS. In the OFDM method, a set of arbitrarily selected multiple subcarriers is determined as one group. A multiple access operation is achieved by adaptively assigning one or more than one groups to each terminal PS. In the wireless communication system of this embodiment, the TDMA method and the TDD method are additionally combined with the above-described OFDMA method. In other words, each group is divided into an uplink and a down link along a direction of a time axis in accordance with the TDD method, and in addition, each of the uplink and the down link is divided into four TDMA slots. In this embodiment, a unit which is obtained by dividing each group along a direction of a time axis as a TDMA slot is called a sub-channel. FIG. 2 shows a relationship between the frequency, TDMA slots and sub-channels in the wireless communication system of this embodiment. A vertical axis indicates the frequency, and a horizontal axis indicates the time. As shown in FIG. 2, 112 sub-channels which are obtained by multiplying 28 in a frequency direction and 4 (four slots) along a direction of a time axis are assigned to the uplink communication and the downlink communication.

In the wireless communication of this embodiment, as shown in FIG. 2, a sub-channel (No. 1 in FIG. 2) which is at an endmost position in a frequency direction between all sub-channels is used as a control channel (CCH). Other sub-channels are used as traffic channels (TCH). Hereinafter, such traffic channels are called traffic sub-channels. One or more traffic sub-channels are arbitrarily selected from all traffic sub-channels (here, 108 sub-channels of 27×4 slots excluding CCH) of the uplink and the downlink and are assigned to the base station CS and the terminal PS that conduct a wireless communication. It should be noted that, as communication channels, the same traffic channels are assigned to traffic channels used for both the uplink communication and the downlink communication.

Figure 3:
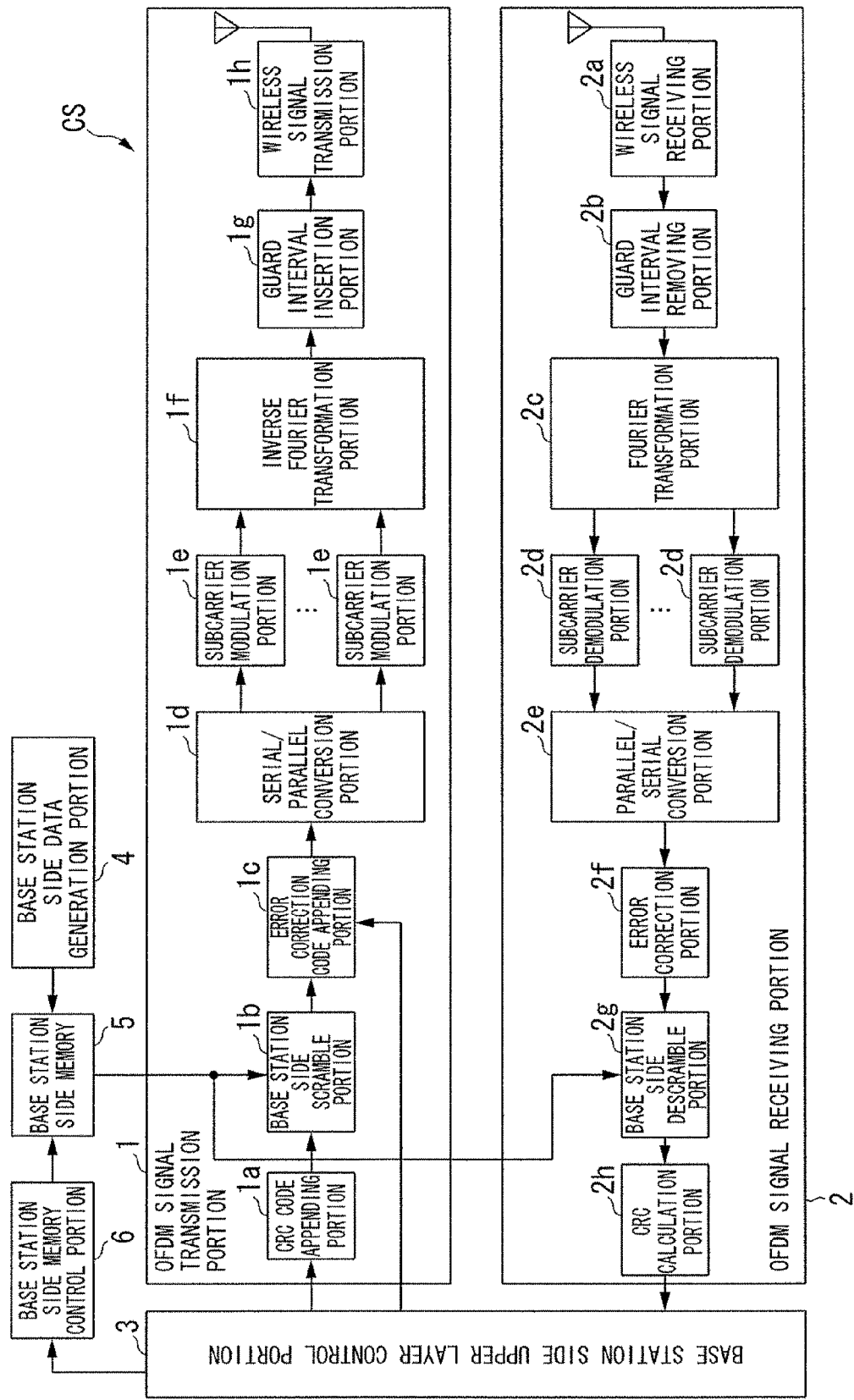
FIG. 3 is a block diagram showing a constitution of a base station CS of one embodiment of the present invention.

In the following, a constitution of the base station CS is explained. FIG. 3 is a block diagram showing a constitution of the base station CS. As shown in FIG. 3, the base station CS includes an OFDM signal transmission portion 1, an OFDM signal receiving portion 2, a base station side upper layer control portion 3, a base station side data generation portion 4, a base station side memory (base station side storing portion) 5, and a base station side memory control portion (base station side lower layer control portion) 6.

The OFDM signal transmission portion 1 is constituted of a CRC code appending portion 1a, a base station side scramble portion 1b, an error correction code appending portion 1c, a serial/parallel conversion portion 1d, subcarrier modulation portions 1e, an inverse Fourier transformation portion 1f, a guard interval insertion portion 1g and a wireless signal transmission portion 1h. The OFDM signal receiving portion 2 is constituted of a wireless signal receiving portion 2a, a guard interval removing portion 2b, a Fourier transformation portion 2c, a subcarrier demodulation portion 2d, a parallel/serial conversion portion 2e, an error correction portion 2f, a base station side descramble portion 2g and a CRC calculation portion 2h.

The CRC code appending portion 1a, based on commands from the base station side upper layer control portion 3, appends CRC codes which is redundant information and which is used for detecting errors to transmission data output from the base station side upper layer control portion 3 and outputs the transmission data to the base station side scramble portion 1b. The base station side scramble portion 1b conducts a multiplication operation between the transmission data output from the CRC code appending portion 1a and the scramble data output from the base station side memory 5 explained below, and outputs the transmission data on which the scrambling operation has been conducted to the error correction code appending portion 1c. It should be noted that it is possible to apply a logical product or an exclusive OR to a multiplication operation on one bit of a binary number, and in this embodiment, an exclusive OR (XOR operation) is used. The error correction code appending portion 1c, based on commands from the base station side upper layer control portion 3, appends error correction codes, for example, convolutional codes, to bit arrays of the transmission data output from the base station side scramble portion 1b, and output the bit arrays to the serial/parallel conversion portion 1d.

The serial/parallel conversion portion 1d which is controlled by the base station side upper layer control portion 3, divides the bit arrays output from the error correction code appending portion 1c so as to correspond to each subcarrier in a bitwise manner, and outputs the divided bit arrays to the corresponding subcarrier modulation portion 1e. The subcarrier modulation portions 1e are included so as to be the same number as the subcarriers. The subcarrier modulation portion 1e, based on the subcarriers, conducts a digital modulation operation on the bit arrays which are divided so as to correspond to each subcarrier, and outputs the modulated signals to the inverse Fourier transformation portion 1f. It should be noted that each of the subcarrier modulation portions 1e conducts a digital modulation based on a modulation method specified by the base station side upper layer control portion 3, for example, BPSK (Binary Phase Shift Keying), PSK (Quadrature Phase Shift Keying), 16QAM (Quadrature Amplitude Modulation) and 64QAM.

The inverse Fourier transformation portion 1f generates OFDM signals by conducting an orthogonal multiplexing operation on the modulated signals input from each of the subcarrier modulation portions 1e in accordance with the inverse Fourier transformation and outputs the OFDM signals to the guard interval insertion portion 1g. The guard interval insertion portion 1g inserts guard intervals into the OFDM signals input from the inverse Fourier transformation portion 1f and outputs the OFDM signals to the wireless signal transmission portion 1h. The wireless signal transmission portion 1h conducts an operation of converting digital signals to analog signals by using a D/A converter on OFDM signals input from the guard interval insertion portion 1g, conducts an operation of converting from the IF frequency band to the RF frequency band on the OFDM signals which are converted to analog signals, amplifies the OFDM signals after conversion to the RF frequency band so as to be a predetermined transmission output level by using, for example, a power amplifier, and transmits the OFDM signals to the terminal PS via an antenna.

The wireless signal receiving portion 2a receives the OFDM signals from the terminal PS via an antenna. The wireless signal receiving portion 2a converts signals in the RF frequency band to the IF frequency band. The wireless signal receiving portion 2a amplifies the OFDM signals in the IF frequency band by using, for example, a low noise amplifier. The wireless signal receiving portion 2a converts the amplified OFDM signals that are analog signals to digital signals by using an A/D converter and outputs the OFDM signals to the guard interval removing portion 2b. The guard interval removing portion 2b removes guard intervals from the OFDM signals input from the wireless signal receiving portion 2a and outputs the OFDM signals to the Fourier transformation portion 2c. The Fourier transformation portion 2c calculates the modulated signals corresponding to the subcarriers by conducting Fourier transformation on the OFDM signals input from the guard interval removing portion 2b and outputs the modulated signals to corresponding subcarrier demodulation portions 2d.

The same number of the subcarrier demodulation portions 2d are included as the number of subcarriers. The subcarrier demodulation portion 2d, on the modulated signals, conducts both phase correction/frequency correction/power correction operations and digital demodulation operation based on the subcarrier, converts the modulated signals to the data sequences of the received data and output the data sequences to the parallel/serial conversion portion 2e. Based on commands from the control portion 3, the parallel/serial conversion portion 2e combines the multiple data sequences input from the subcarrier demodulation portions 2d into one data sequence and output the data sequence to the error correction portion 2f.

The error correction portion 2f which is controlled by the base station side upper layer control portion 3 conducts an error correction operation on the data sequence input from the parallel/serial conversion portion 2e, and output the data sequence (received data) to the base station side descramble portion 2g. The base station side descramble portion 2g conducts an XOR (exclusive OR) operation between the received data output from the error correction portion 2f and the scramble data output from the base station side memory 5, and outputs the received data on which the XOR operation has been conducted to the CRC calculation portion 2h. In accordance with a controlling operation by the base station side upper layer control portion 3, based on a CRC code for error detection appended to the data sequence, the CRC calculation portion 2h conducts a CRC calculation and outputs the received data with the CRC calculation results to the base station side upper layer control portion 3.

The base station side upper layer control portion 3 has a constitution including a CPU (Central Processing Unit), an internal memory constituted from ROM (Read Only Memory) and RAM (Random Access Memory), interface circuits which conduct input/output operations regarding various signals from/to both the OFDM signal transmission portion 1 and the OFDM signal receiving portion 2, or the like. The base station side upper layer control portion 3 controls overall operations of the base station CS based on control programs stored in the ROM and various signals received by the OFDM signal receiving portion 2.

Figure 4:
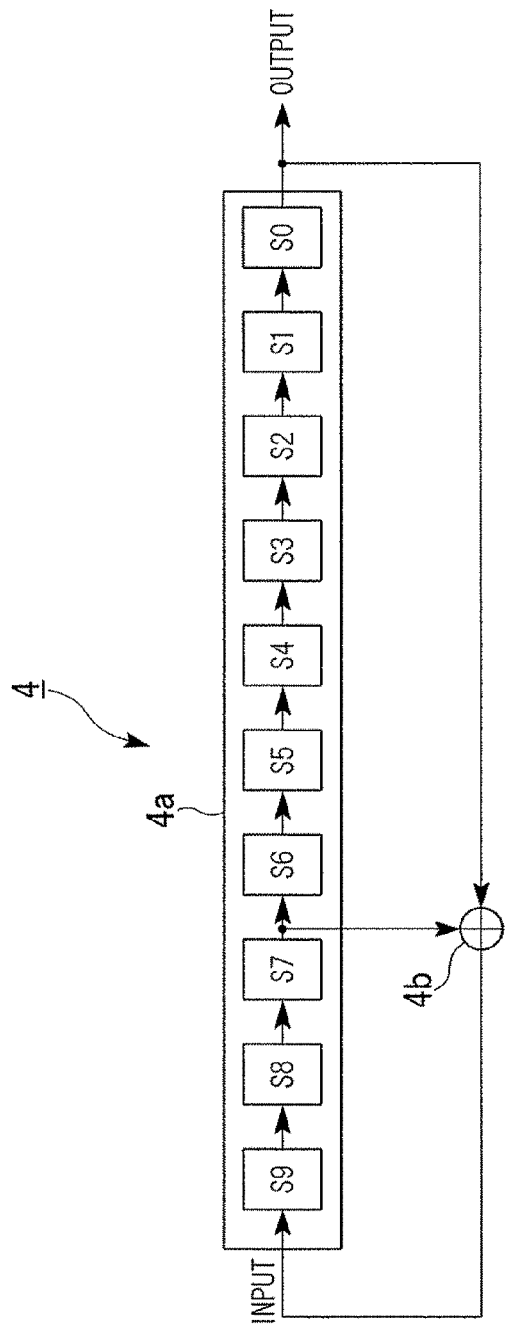
FIG. 4 is a drawing for detailed explanation of a base station side data generation portion 4 of one embodiment of the present invention.

When the base station is started, the base station side data generation portion 4 generates a number of sets of the scramble data which are different from each other while the number of sets of the scramble data is the same number as or more than the number obtained by multiplying the number of sub-channels used in the overall system by the number of the subcarriers, and outputs the scramble data to the base station side memory 5. FIG. 4 shows a detailed constitution of the base station side data generation portion 4. As shown in FIG. 4, the base station side data generation portion 4 is constituted from a shift register 4*a* and an OR circuit 4*b*. The shift register 4*a* is a shift register corresponding to a number of bits B (in this embodiment, for example, B=9) which satisfies a condition formula $2^B-1 \geqq Ns \times Nc$ while Ns is a number of the sub-channels, Nc is a number of the subcarriers and B is a number of bits. The OR circuit 4*b* includes one input terminal which is connected to an output terminal of a final step of the shift register 4*a*, another input terminal which is connected to an output terminal of a predetermined step (in this embodiment, for example, an output terminal corresponding to the seventh bit) of the shift register 4*a*, and an output terminal which is connected to an input terminal of the shift register 4*a*. As an initial value, base station information (for example, a base station ID) which is information of nine bits is set to the shift register 4*a*, and in this embodiment, at least 511 sets of the scramble data are generated by the base station side data generation portion 4.

The base station side memory 5 stores the scramble data generated by the base station side data generation portion 4. Further, in accordance with control by the base station side memory control portion 6, the base station side memory 5 outputs the scramble data to both the base station side scramble portion 1*b* and the base station side descramble portion 2*g*. Based on the information of the sub-channels which are assigned to the terminal PS at the other end of the communication that is output from the base station side upper layer control portion 3, the base station side memory control portion 6 controls the base station side memory 5 so as to output the scramble data corresponding to the sub-channels which are assigned to the terminal PS at the other end of the communication. In a concrete example, the base station side memory control portion 6 outputs an address signal which indicates a starting address of a storage area of the scramble data corresponding to the sub-channels assigned to the terminal PS at the other end of the communication. By incrementing such a starting address pointed by the address signal, it is possible to output the scramble data one-bit-at-a-time which corresponds to the sub-channels assigned to the terminal PS at the other end of the communication.

Figure 5:
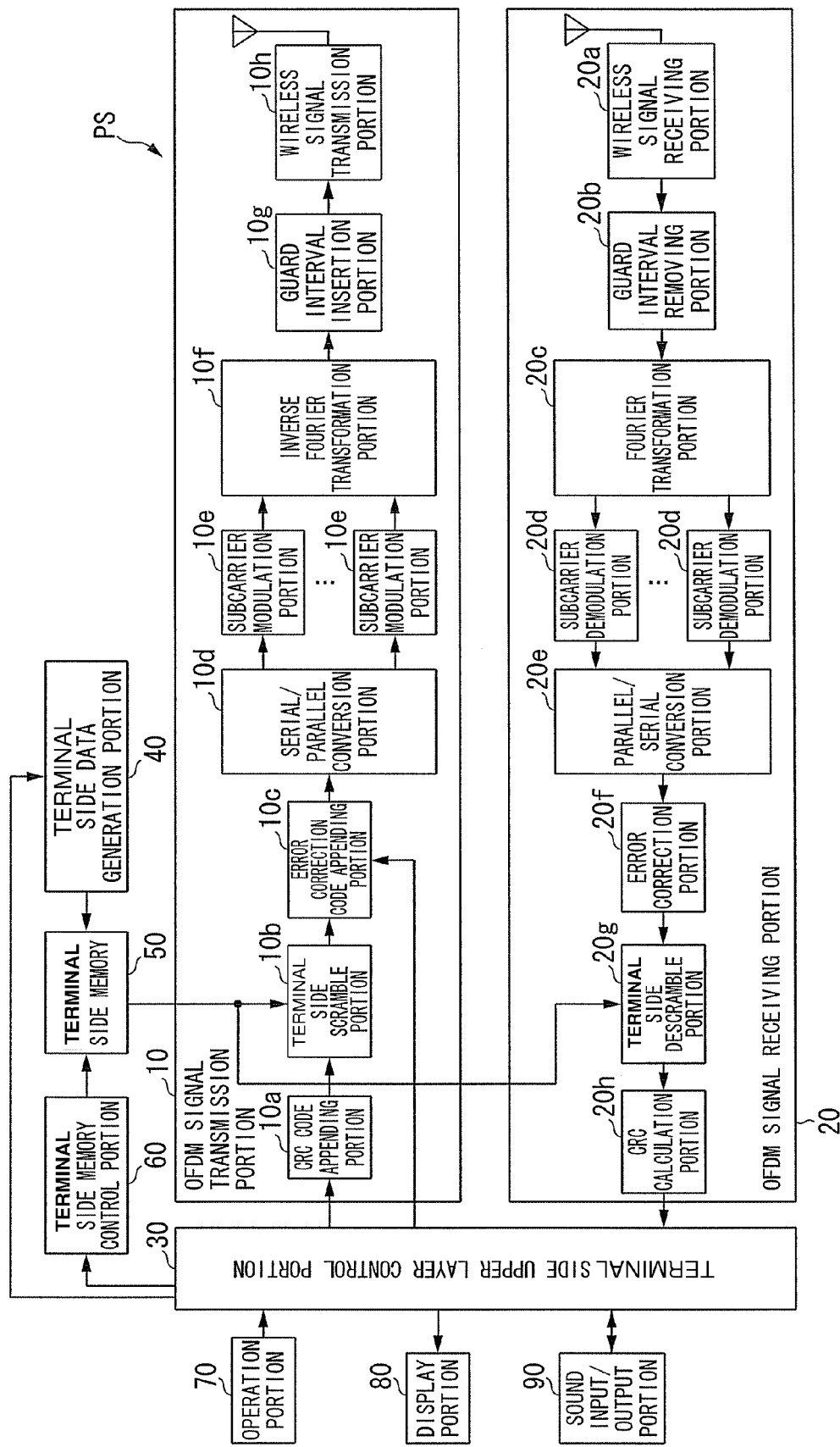
FIG. 5 is a block diagram showing a constitution of a terminal PS of one embodiment of the present invention.

The following is a detailed explanation regarding a constitution of the terminal PS. FIG. 5 is a block diagram showing a constitution of a terminal PS. As shown in FIG. 5, the terminal PS includes an OFDM signal transmission portion 10, an OFDM signal receiving portion 20, a terminal side upper layer control portion 30, a terminal side data generation portion 40, a terminal side memory (terminal side storing portion) 50, a terminal side memory control portion (terminal side lower control portion) 60, an operation portion 70, a display portion 80 and a sound input/output portion 90.

The OFDM signal transmission portion 10 is constituted from a CRC code appending portion 10*a*, a terminal side scramble portion 10*b*, an error correction code appending portion 10*c*, a serial/parallel conversion portion 10*d*, a subcarrier modulation portions 10*e*, an inverse Fourier transformation portion 10*f*, a guard interval insertion portion 10*g* and a wireless signal transmission portion 10*h*. The OFDM, signal receiving portion 20 is constituted from a wireless signal receiving portion 20*a*, a guard interval removing portion 20*b*, a Fourier transformation portion 20*c*, a subcarrier demodulation portion 20*d*, a parallel/serial conversion portion 20*e*, an error correction portion 20*f*, a terminal side descramble portion 20*g* and a CRC calculation portion 20*h*. Functions of each constitutional element of both the OFDM signal transmission portion 10 and the OFDM signal receiving portion 20 are substantially equivalent to the base station CS, and detailed explanations are omitted.

The terminal side upper layer control portion 30 has a constitution including a CPU (Central Processing Unit), an internal memory constituted from ROM (Read Only Memory) and RAM (Random Access Memory), interface circuits which conduct input/output operations regarding various signals from/to both the OFDM signal transmission portion 10 and the OFDM signal receiving portion 20, and the like. The terminal side upper layer control portion 30 controls overall operations of the terminal PS based on control programs stored in the ROM, various signals received by the OFDM signal receiving portion 20, operation signals input from the operation portion 70 and sound signals input from the sound signal input/output portion 90.

The terminal side data generation portion 40, when establishing a communication connection with the base station, based on the base station information received from the base station CS at the other end of the communication, generates the same scramble data as the base station CS at the other end of the communication. In a concrete example, such a terminal side data generation portion 40 has substantially equivalent constitution as the base station side data generation portion 4 (see FIG. 4). In the terminal side data generation portion 40, in accordance with control by the terminal side upper layer control portion 30, the base station information (base station ID) which is received from the base station CS at the other end of the communication is set to the shift register as an initial value, and the scramble data is generated that is the same as the base station CS at the other end of the communication.

The terminal side memory 50 stores the scramble data generated by the terminal side data generation portion 40. In accordance with control by the terminal side memory control portion 60, the terminal side memory 50 outputs the stored scramble data to both the terminal side scramble portion 10*b* and the terminal side descramble portion 20*g*. Based on the information of the sub-channels which are assigned by the base station CS at the other end of the communication that is output from the terminal side upper layer control portion 30, the terminal side memory control portion 60 controls the terminal side memory 50 so as to output the scramble data corresponding to the sub-channels which are assigned by the base station CS at the other end of the communication.

The operation portion 70 has a constitution including various operation keys such as a power key, function keys and ten keys, and outputs operation signals to the terminal side upper layer control portion 30 in correspondence with user's operation on such operation keys. The display portion 80 is, for example, a liquid crystal panel and an organic EL panel and displays, for example, predetermined images in accordance with control by the terminal side upper layer control portion 30. The sound signal input/output portion 90 is constituted from a microphone and a speaker, conducts a digital conversion operation on a sound input from the microphone, outputs sound signals obtained by the digital conversion operation to the terminal side upper layer control portion 30 and further, outputs a sound via the speaker based on sound signals input from the terminal side upper layer control portion 30.

Figure 6:
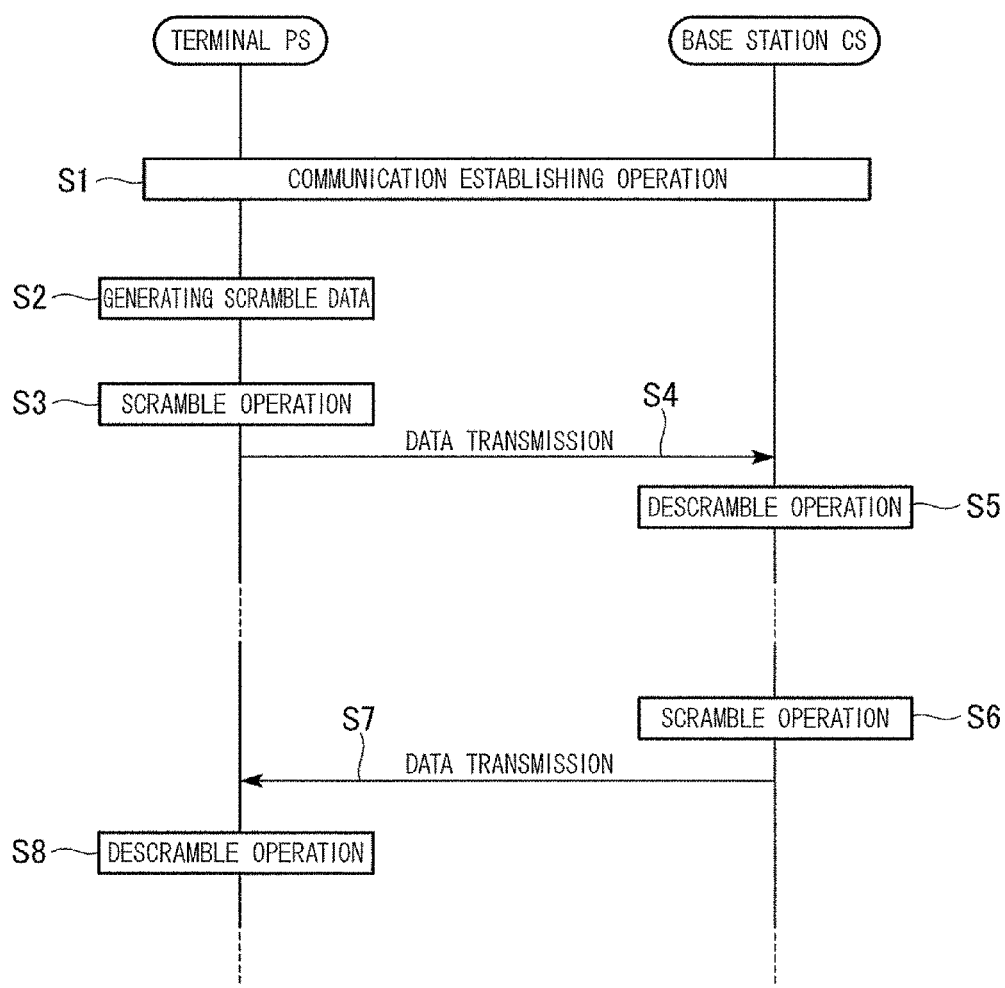
FIG. 6 is a flowchart showing operations of a wireless communication system of one embodiment of the present invention.

In the following, in reference to a flowchart of FIG. 6, operations of a wireless communication system are explained which is constituted from the base station CS and the terminal PS described above. It should be noted that in the base station CS, the scramble data is generated by the base station side data generation portion 4 and is stored in the base station side memory 5.

First, when an operation signal is input from the operation portion 70 that requests a data transmission, the terminal side upper layer control portion 30 of the terminal PS controls the OFDM signal receiving portion 20 so as to search for control channels (CCH) which are transmitted from the base stations CS. The terminal side upper layer control portion 30 conducts an operation of establishing a communication connection with one of the base stations CS which is transmitting the control channel that can be detected and that is in the most preferable receiving condition (Step S1). In this step which is an operation of establishing the communication connection, the terminal side upper layer control portion 30 of the terminal PS receives, for example, the base station information (base station ID) of the base station CS at the other end of the communication and the information regarding the assigned traffic sub-channels assigned (for example, sub-channel numbers) from the base station CS at the other end of the communication via the control channel.

Further, after establishing the communication connection, the terminal side upper layer control portion 30 of the terminal PS sets the base station information (base station ID) received from the base station CS at the other end of the communication, as an initial value, to the shift register of the terminal side data generation portion 40. Therefore, the same scramble data as the base station CS at the other end of the communication is generated by the terminal side data generation portion 40, and the generated scramble data is stored in the terminal side memory 5 (Step S2).

In the following, the terminal side upper layer control portion 30 of the terminal PS outputs the transmission data to the CRC code appending portion 10a. The terminal side upper layer control portion 30 outputs the information of the sub-channels that is assigned by the base station CS at the other end of the communication to the terminal side memory control portion 60. The terminal side memory control portion 60, based on the information of the sub-channels, outputs the address signal to the terminal memory 50 that indicates the starting address pointing a storage area of the scramble data corresponding to the sub-channels assigned by the base station CS at the other end of the communication. The terminal side memory control portion 60, by incrementing such a starting address pointed by the address signal, outputs the scramble data one-bit-at-a-time which corresponds to the assigned sub-channels.

The terminal side scramble portion 10b conducts an XOR operation between the transmission data output from the CRC code appending portion 10a and the scramble data output from the terminal side memory 50. The terminal side scramble portion 10b conducts a scramble operation on the transmission data based on operation results of the XOR operation (Step S3). Here, for example, the scramble data corresponding to the sub-channel NO. "1" is assigned to the transmission data corresponding to the sub-channel NO. "1", and the scramble data corresponding to the sub-channel NO. "2" is assigned to the transmission data corresponding to the sub-channel NO. "2". Therefore, the transmission data is randomized between the sub-channels. It should be noted that, for an object of ensuring sufficient randomization of the transmission data between the sub-channels, there is a condition in which it is necessary to generate a number of sets of the scramble data that is the same as or more than the number obtained by multiplying the number of sub-channels by the number of the subcarriers that are used in the overall system. Regarding this condition, in this embodiment, the scramble data is generated by using the shift register 4a corresponding to the number of bits B which satisfies a condition formula $2^B-1 \geq Ns \times Nc$ while Ns is the number of the sub-channels, Nc is the number of the subcarriers and B is the number of bits. Therefore, this embodiment ensures sufficient randomization of the transmission data between the sub-channels.

The transmission data on which the scramble operation is conducted is transmitted to the base station CS at the other end of the communication via the error correction code appending portion 10c, the serial/parallel conversion portion 10d, the subcarrier modulation portions 10e, the inverse Fourier transformation portion 10f, the guard interval insertion portion 10g and the wireless signal transmission portion 10h (Step S4).

Further, the above-described transmission data is received by the wireless signal receiving portion 2a of the base station CS at the other end of the communication and output as the received data to the base station side descramble portion 2g via the guard interval removing portion 2b, the Fourier transformation portion 2c, the subcarrier demodulation portion 2d, the parallel/serial conversion portion 2e and the error correction portion 2f. On the other hand, based on the information of the sub-channels output from the base station side upper layer control portion 3, the base station side memory control portion 6 outputs an address signal to the base station side memory 5 that indicates the starting address pointing a storage area of the scramble data corresponding to the sub-channels assigned to the terminal PS at the other end of the communication. The base station side memory control portion 6, by incrementing such a starting address pointed by the address signal, outputs the scramble data one-bit-at-a-time which corresponds to the sub-channels assigned to the terminal PS at the other end of the communication.

The base station side descramble portion 2g conducts an XOR operation between the received data output from the error correction portion 2f and the scramble data output from the base station side memory 5. The base station side descramble portion 2g conducts a descramble operation on the received data based on operation results of such an XOR operation (Step S5). Here, the scramble data applied to the descramble operation is common between the base station CS and the terminal PS that are at the other end of the communication each other, and it is possible to conduct the descramble operation on the received data without causing any problems. In accordance with such an operation, the received data on which the descramble operation is conducted is output to the base station side upper layer control portion 3 via the CRC calculation portion 2h, and the base station side upper layer control portion 3 conducts a predetermined signal operation based on such received data.

An example is explained above in which the data is transmitted from the terminal PS to the base station CS, and an operation is in the same manner in which the data is transmitted from the base station CS to the terminal PS. In other words, the base station side upper layer control portion 3 of the base station CS outputs the transmission data to the CRC code appending portion 1a and outputs the information of sub-channels to the base station side memory control portion 6 that are assigned to the terminal PS at the other end of the communication. Based on the information of the sub-channels, the base station side memory control portion 6 outputs an address signal to the base station side memory 5 that indicates the starting address pointing a storage area of the scramble data corresponding to the sub-channels assigned to the terminal PS at the other end of the communication. The base station side memory control portion 6, by incrementing such a starting address pointed by the address signal, outputs the scramble data one-bit-at-a-time which corresponds to the assigned sub-channels.

The base station side scramble portion 1b conducts an XOR operation between the transmission data output from the CRC code appending portion 1a and the scramble data output from the base station side memory 5. The base station side scramble portion 1b conducts a scramble operation on the transmission data based on operation results of such an XOR operation (Step S6), The transmission data on which the scramble operation is conducted is transmitted to the terminal PS at the other end of the communication via the error correction code appending portion 1c, the serial/parallel conversion portion 1d, the subcarrier modulation portions 1e, the inverse Fourier transformation portion 1f, the guard interval insertion portion 1g and the wireless signal transmission portion 1h. (Step S7).

Further, the above-described transmission data is received by the wireless signal receiving portion 20a of the terminal PS at the other end of the communication and is output as the received data to the terminal side descramble portion 20g via the guard interval removing portion 20b, the Fourier transformation portion 20c, the subcarrier demodulation portion 20d, the parallel/serial conversion portion 20e and the error correction portion 20f. On the other hand, based on the information of the sub-channels output from the terminal side upper layer control portion 30, the terminal side memory control portion 60 outputs an address signal to the terminal side memory 50 that indicates the starting address pointing to a storage area of the scramble data corresponding to the sub-channels assigned by the base station CS at the other end of the communication. The terminal side memory control portion 60, by incrementing such a starting address pointed by the address signal, outputs the scramble data one-bit-at-a-time which corresponds to the assigned sub-channels.

The terminal side descramble portion 20g conducts an XOR operation between the received data output from the error correction portion 20f and the scramble data output from the terminal side memory 50. The terminal side descramble portion 20g conducts a descramble operation on the received data based on operation results of such an XOR operation (Step S8). Here, the scramble data applied to the descramble operation is common between the base station CS and the terminal PS that are at the other end of the communication with each other, and it is possible to conduct the descramble operation on the received data without causing any problems. In accordance with such an operation, the received data on which the descramble operation is conducted is output to the terminal side upper layer control portion 30 via the CRC calculation portion 20h, and the terminal side upper layer control portion 30 conducts a predetermined signal operation based on such received data.

As described above, by using the wireless communication system of this embodiment, it is not necessary to include memories (base station side memory 5, terminal side memory 50) for storing the scramble data in accordance with a number of sub-channels, and it is possible to avoid an increase in cost. In addition, regarding the base station CS, when the base station CS is started, and regarding the terminal PS, when the terminal PS establishes a communication connection with the base station CS at the other end of communication, the scramble data is stored in the memories, and in a communication conducted afterward, a randomizing (scramble) operation is conducted on the data between sub-channels by using the scramble data stored in the memories. Therefore, a problem does not occur in which the communication speed is deteriorated by using a method of the prior art that generates the scramble data every time the data is transmitted. Therefore, in accordance with this embodiment, when using the multicarrier communication, it is possible to reduce the peak factor by randomizing data between the sub-channels without both increased cost and reduced communication speed.

It should be noted that, in the above-described embodiment, the shift register 4a having a number of bits "9" as the base station side data generation portion 4 and the terminal side data generation portion 40 that generate the scramble data, and this is not a limitation. It is possible to appropriately adjust a number of bits based on a number of sub-channels and a number of subcarriers that are used by an overall system. In addition, the base station ID is introduced as an example that is set as an initial value to the shift register 4a, and it is possible use other information that is specific to the base station. Further, it is not required to apply the shift register 4a to a constitutional element of the base station side data generation portion 4 and the terminal side data generation portion 40. It is possible to use other constitutional elements 1f it is possible to generate a number of sets of the different scramble data that is the same as or more than the number obtained by multiplying the number of sub-channels by the number of the subcarriers that are used in the overall system.

Further, in the above-described embodiment, a wireless communication system is described to which an OFDM method is applied, and not only OFDM, but also it is possible to apply the present invention to other wireless communication systems that use a multicarrier communication.

INDUSTRIAL APPLICABILITY

In accordance with the present invention, in a wireless communication system, a base station, a terminal apparatus and a wireless communication method that use the multicarrier communication, it is possible to reduce the peak factor by randomizing data between the sub-channels without both increased cost and low communication speed.

The invention claimed is:

1. A wireless communication system comprising first and second apparatuses, wherein
    said first apparatus comprises;
        a scramble data generation portion configured to generate, based on first information, a plurality of sets of pseudorandom scramble data;
        a first scramble module configured to scramble second data using third data, wherein the third data includes a portion of the scramble data corresponding to one or more sub-channels assigned for communication between the first and second apparatuses; and
        a first transmission portion configured to transmit fourth data to the second apparatus, wherein the fourth data is based on an output of the first scramble module,
    said second apparatus comprises:
        a first receiving portion configured to receive the fourth data from the first apparatus;
        a descramble data generation portion configured to generate, based on the first information received beforehand from the first apparatus, a copy of the scramble data; and
        a first descramble module configured to descramble fifth data using the third data, wherein the fifth data is based on the fourth data.

2. A wireless communication system according to claim 1, wherein said first apparatus further comprises:
    a second receiving portion configured to receive sixth data from the second apparatus; and a second descramble module configured to descramble seventh data using the third data, wherein the seventh data is based on the sixth data, said second apparatus comprises:

a second scramble module configured to scramble eighth data using the third data; and a second transmission portion configured to transmit the sixth data to the first apparatus, wherein the sixth data is based on an output of the second scramble module.

3. A wireless communication system according to claim 1, wherein each of the scramble data generation portion and the descramble data generation portion further comprises:

a shift register corresponding to a number of bits B which satisfies a condition formula $2^B-1 \geq Ns \times Nc$ wherein Ns is a total number of the sub-channels of the wireless communication system and Nc is a total number of the subcarriers of the wireless communication system; and an OR circuit which comprises: one input terminal which is connected to an output terminal of a final step of the shift register; another input terminal which is connected to an output terminal of a predetermined step of the shift register; and an output terminal which is connected to an input terminal of the shift register.

4. A wireless communication system comprising a base station and a terminal, wherein said base station comprises:

a base station side data generation portion configured to generate a number of sets of pseudorandom scramble data wherein the number of sets of the scramble data is more than a number obtained by multiplying a total number of the sub-channels used in said overall wireless communication system by a total number of subcarriers of the wireless communication system:

a base station side memory configured to store the scramble data generated by the base station side data generation portion;

a base station side upper layer control portion which outputs both transmission data for a terminal at an other end of a communication and sub-channel information specifying one or more sub-channels that are assigned to the terminal at the other end of the communication;

a base station side lower layer control portion configured to, based on the sub-channel information, control the base station side memory to output a portion of the scramble data corresponding to the sub-channels that are assigned to the terminal at the other end of the communication; and a base station side scramble module configured to perform logical operation between the transmission data output from the base station side upper layer control portion and the portion of the scramble data output from the base station side memory based on a control by the base station side lower layer control portion, said terminal apparatus comprises:

a terminal side data generation portion configured to, when establishing a communication connection with the base station, based on base station information received from the base station, generate the same scramble data as the base station;

a terminal side memory configured to store the scramble data generated by the terminal side data generation portion;

a terminal side upper layer control portion which outputs both transmission data for the base station at the other end of the communication and the sub-channel information;

a terminal side lower layer control portion configured to, based on the sub-channel information received from the terminal side upper layer control portion, control the terminal side memory to output the portion of the scramble data of the terminal apparatus corresponding to the sub-channels that are assigned by the base station at the other end of the communication; and a terminal side scramble module configured to perform a logical operation between the transmission data output from the terminal side upper layer control portion and the portion of the scramble data output from the terminal side memory based on a control by the terminal side lower layer control portion.

5. A wireless communication system according to claim 4, wherein said base station further comprises a base station side descramble module configured to perform a logical operation between first data and the portion of the scramble data output from the base station side memory, wherein the first data is based on data received from the terminal, and said terminal further comprises a terminal side descramble module configured to perform a logical operation between second data and the scramble data output from the terminal side memory, wherein the second data is based on data received from the base station.

6. A wireless communication system according to claim 4, wherein each of the base station side data generation portion and the terminal side data generation portion further comprises:

a shift register corresponding to a number of bits B which satisfies a condition formula $2^B-1 \geq Ns \times Nc$ wherein Ns is a total number of the sub-channels of the wireless communication system and Nc is the number of subcarriers; and an OR circuit which comprises: one input terminal which is connected to an output terminal of a final step of the shift register; another input terminal which is connected to an output terminal of a predetermined step of the shift register; and an output terminal which is connected to an input terminal of the shift register.

7. A base station comprising:

a base station side data generation portion configured to generate a number of sets of pseudorandom scramble data wherein the number of sets of the scramble data is more than a number obtained by multiplying a total number of the sub-channels used in a wireless communication system including said base station by a total number of the subcarriers of the wireless communication system;

a base station side memory configured to store the scramble data generated by the base station side data generation portion;

a base station side upper layer control portion which outputs both transmission data for a terminal at an other end of a communication and sub-channel information specifying one or more sub-channels that are assigned to the terminal at the other end of the communication;

a base station side lower layer control portion configured to, based on the sub-channel information, control the base station side memory to output a portion of the scramble data corresponding to the sub-channels that are assigned to the terminal at the other end of the communication; and a base station side scramble module configured to perform a logical operation between the transmission data output from the base station side upper layer control portion and the portion of the scramble data output from the base station side memory based on a control by the base station side lower layer control portion.

8. A base station according to claim 7 further comprising a base station side descramble module configured to perform a logical operation between first data and the portion of the scramble data output from the base station side memory, wherein the first data is based on data received from the terminal.

9. A base station according to claim 7, wherein
said base station side data generation portion further comprises:
a shift register corresponding to a number of bits B which satisfies a condition formula $2^B-1 \geqq Ns \times Nc$ wherein Ns is a total number of the sub-channels of the wireless communication system and Nc is the total number of the subcarriers; and
an OR circuit which comprises: one input terminal which is connected to an output terminal of a final step of the shift register; another input terminal which is connected to an output terminal of a predetermined step of the shift register; and an output terminal which is connected to an input terminal of the shift register.

10. A terminal comprising:
a terminal side data generation portion configured to, when establishing a communication connection with a base station, based on base station information received from the base station, generate pseudorandom scramble data identical to scramble data at the base station;
a terminal side memory configured to store the scramble data generated by the terminal side data generation portion;
a terminal side upper layer control portion which outputs both transmission data for the base station at the other end of the communication and sub-channel information specifying one or more sub-channels assigned by the base station at the other end of the communication;
a terminal side lower layer control portion configured to, based on the sub-channel information, control the terminal side memory to output a portion of the scramble data of the terminal corresponding to the sub-channels that are assigned by the base station at the other end of the communication; and
a terminal side scramble module configured to perform a logical operation between the transmission data output from the terminal side upper layer control portion and the portion of the scramble data output from the terminal side memory based on a control by the terminal side lower layer control portion.

11. A terminal according to claim 10, further comprising a terminal side descramble module configured to perform a logical operation between first data and the scramble data output from the terminal side memory, wherein the first data is based on data received from the base station.

12. A terminal according to claim 10, wherein
said terminal side data generation portion comprises:
a shift register corresponding to a number of bits B which satisfies a condition formula $2^B-1 \geqq Ns \times Nc$ wherein Ns is a total number of sub-channels of a wireless communication system comprising the terminal and the base station and Nc is a total number of the subcarriers of the wireless communication system; and
an OR circuit which comprises: one input terminal which is connected to an output terminal of a final step of the shift register; another input terminal which is connected to an output terminal of a predetermined step of the shift register; and an output terminal which is connected to an input terminal of the shift register.

13. A wireless communication method for conducting a communication between a base station and a terminal, said method comprising:
a first step of on the base station, generating a number of sets of pseudorandom scramble data wherein the number of sets of the scramble data is more than a number obtained by multiplying a total number of the sub-channels used in an overall wireless communication system including the base station and the terminal by a total number of the subcarriers of the wireless communication system;
a second step of storing the scramble data generated in the first step;
a third step of, based on sub-channel information, reading a portion of the scramble data corresponding to one or more of the sub-channels assigned to the terminal;
a fourth step of conducting a logical operation between the portion of the scramble data read in the third step and transmission data;
a fifth step of, by the terminal, when establishing a communication connection with the base station, based on base station information received from the base station, generating the same scramble data as the base station;
a sixth step of storing the scramble data generated in the fifth step;
a seventh step of, based on the sub-channel information received from the base station, reading a portion of the scramble data stored in the sixth step corresponding to the sub-channels that are assigned by the base station at the other end of the communication; and
an eighth step of conducting a logical operation between the portion of the scramble data read in the seventh step and first data, wherein the first data is based on data received from the base station.

14. A wireless communication system according to claim 2, wherein
each of the scramble data generation portion and the descramble data generation portion further comprises:
a shift register corresponding to a number of bits B which satisfies a condition formula $2^B-1 \geqq Ns \times Nc$ wherein Ns is a total number of the sub-channels of the wireless communication system and Nc is a total number of the subcarriers of the wireless communication system; and
an OR circuit which comprises: one input terminal which is connected to an output terminal of a final step of the shift register; another input terminal which is connected to an output terminal of a predetermined step of the shift register; and an output terminal which is connected to an input terminal of the shift register.

15. A wireless communication system according to claim 5 wherein
each of the base station side data generation portion and the terminal side data generation portion further comprises:
a shift register corresponding to a number of bits B which satisfies a condition formula $2^B-1 \geqq Ns \times Nc$ wherein Ns is a total number of the sub-channels of the wireless communication system and Nc is the number of subcarriers; and an OR circuit which comprises: one input terminal which is connected to an output terminal of a final step of the shift register; another input terminal which is connected to an output terminal of a predetermined step of the shift register; and an output terminal which is connected to an input terminal of the shift register.

* * * * *